March 6, 1956 W. I. DENTON 2,737,471
HYDRO-CATALYTIC DESULFURIZATION OF PETROLEUM OILS
Filed June 8, 1951 2 Sheets-Sheet 1
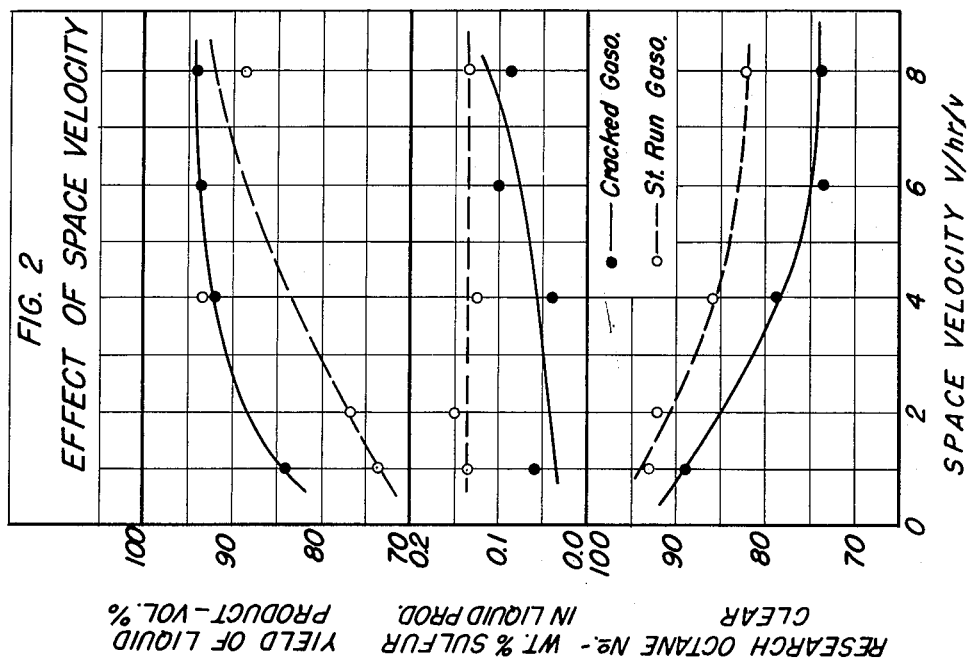
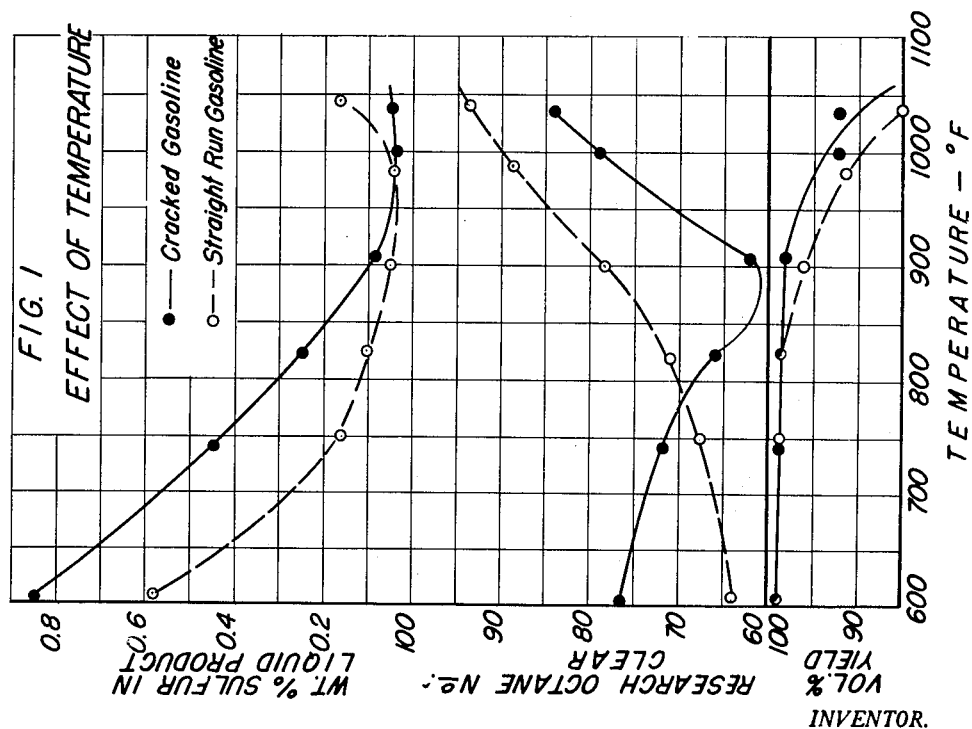
INVENTOR.
William I. Denton
BY Raymond W. Barclay
ATTORNEY March 6, 1956 W. I. DENTON 2,737,471
HYDRO-CATALYTIC DESULFURIZATION OF PETROLEUM OILS
Filed June 8, 1951 2 Sheets-Sheet 2
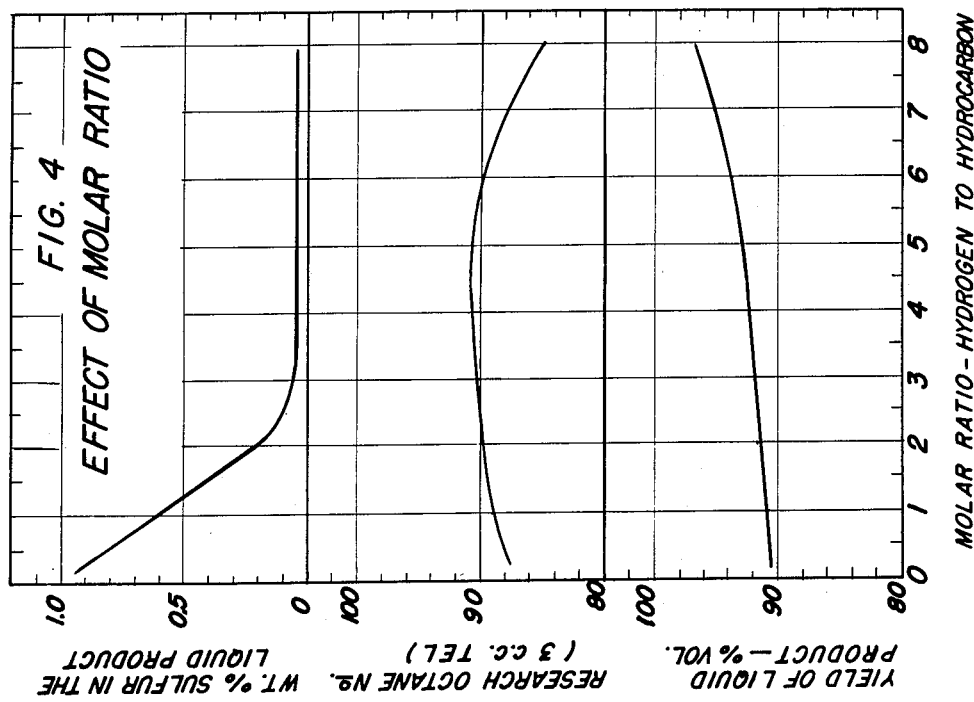
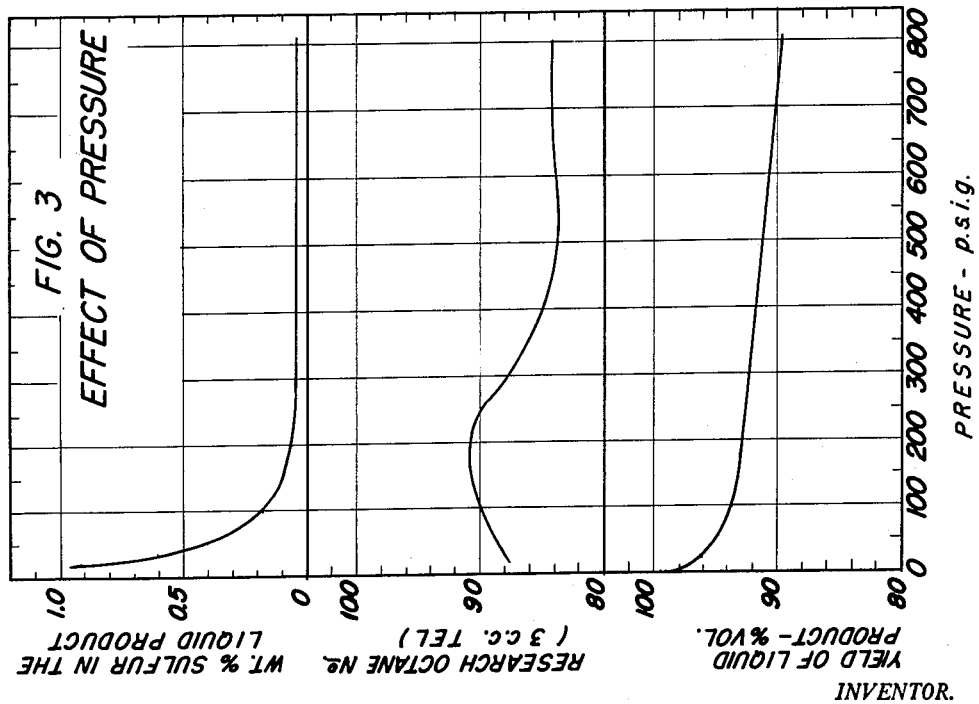
INVENTOR.
William I. Denton
BY Raymond W. Barclay
ATTORNEY

United States Patent Office 2,737,471
Patented Mar. 6, 1956

2,737,471

HYDRO-CATALYTIC DESULFURIZATION OF PETROLEUM OILS

William I. Denton, Woodbury, N. J., assignor to Socony Mobil Oil Company, Inc., a corporation of New York Application June 8, 1951, Serial No. 230,588

10 Claims. (Cl. 196—28)

This invention relates to the treatment of lower boiling gasoline hydrocarbon fractions produced upon cracking heavy petroleum oils. More specifically, the present invention is concerned with the removal of sulfur from thermally cracked gasolines, catalytically cracked gasolines, thermally reformed gasolines and similar materials of the gasoline boiling range containing appreciable amounts of olefins and other unsaturates. In particular, the invention relates to the treatment of such hydrocarbon stocks by the combined action of hydrogen and a catalyst under such conditions and in such manner as to effect substantial desulfurization thereof with simultaneous improvement in anti-knock characteristics.

Petroleum hydrocarbons generally contain varying amounts of sulfur compounds as impurities. Among these sulfur compounds may be mentioned hydrogen sulfide, mercaptans, alkyl sulfides, dialkyl sulfides, thiophanes, and thiophenes which are distributed in the various products obtained from crude hydrocarbon stocks according to their boiling points or to their relative volatility in hydrocarbon mixtures. Also, the particular kind and amounts of said sulfur compounds present in a petroleum hydrocarbon vary with the previous manufacturing and processing operations to which said petroleum hydrocarbon has been subjected. Thus, straight-run gasolines generally contain, for the most part, non-refractory type sulfur compounds, notably hydrogen sulfide, mercaptans, disulfides and, to a lesser extent, aliphatic sulfides, together with some refractory type sulfur compounds, including cyclic ring compounds, of which the thiophanes and thiophenes are typical examples. Some straight-run gasolines contain no refractory type sulfur compounds and, therefore, can be relatively easily desulfurized by conventional methods. Cracked gasolines, on the other hand, generally contain appreciably greater amounts of the refractory type sulfur compounds, which are difficult to remove, and it has been reported that cracking operations have a tendency to convert the non-refractory open-chain sulfur compounds and hydrogen sulfide into the refractory cyclic compounds.

All of the foregoing sulfur compounds are objectionable in motor fuels because of their bad odor, because they reduce the effectiveness of tetraethyl lead, and also generally because of their corrosive tendencies either before or after combustion in the cylinders of internal combustion engines. The non-refractory sulfur compounds can be altered to less objectionable form or removed by a number of conventional treating operations, such as catalytic decomposition in the vapor phase, treatment with acid, adsorption in the liquid phase with silica gel or bauxite, oxidation with doctor solution and processing with caustic-tannin. Refractory sulfur compounds, however, are not removed by any of the foregoing methods. Since it is generally essential to effect removal of substantially all sulfur from gasoline stocks intended for motor fuels, considerable attention has been given in the past to certain catalytic hydrogenation procedures which are capable of removing all of the various type sulfur compounds, including refractory sulfur compounds, from petroleum hydrocarbons. Such procedures have been advantageously employed in treating straight-run gasolines but have not been generally useful when applied to cracked or olefinic gasolines. Hydrogenation of the latter stocks has been detrimental to the octane number since the paraffins thereby formed have a much lower octane rating than the original olefins. Moreover, the catalysts heretofore employed in such hydrogenation procedures have been characterized by poor stability, exhibiting a sharp decline in desulfurizing ability with aging when used in treatment of olefinic stocks containing refractory sulfur compounds.

Thus, one typical hydrogenation process is that wherein molybdena deposited on alumina gel is used as a catalyst. This process will effect removal of refractory-type sulfur. With treatment of straight-run, essentially saturated gasoline stocks, there is a net increase in the quantity of hydrogen. With olefinic stocks, however, hydrogen is consumed in relatively large quantities and when this process is applied to cracked gasolines containing refractory sulfur, several factors make its use somewhat impractical. For example, the catalyst of molybdena on alumina gel rapidly loses activity in so far as desulfurizing ability is concerned. The relatively large amount of coke deposited on the catalyst decreases the on-stream efficiency and makes regeneration difficult. In addition, the regeneration is further complicated by the fact that large amounts of additional heat are liberated when the molybdenum is oxidized from reduced form to $MoO_3$. Furthermore, the molybdena-alumina gel catalyst employed is inherently characterized by a physical weakness which leads to break-up and formation of undesirable fines when used in a moving-bed reactor system. During reaction with such catalyst, sulfur is removed by direct combination with molybdenum to form the sulfide. In the regeneration step, this sulfur is removed as $SO_2$, which creates a health hazard if released into the air in too great a concentration. Separation of the $SO_2$ from other combustion gases is impractical.

Other well-known hydrogenation catalysts are chromium and nickel. A catalyst of nickel on a support such as kieselguhr may be used to desulfurize cracked naphthas but its commercial utilization is severely limited since its desulfurization ability rapidly depreciates with use and after less than ten cycles the catalyst is, for all practical purposes, rendered useless. Chromia deposited on porous supporting materials, such as activated alumina and bauxite, has been used as a dehydrogenation and reforming catalyst. These catalysts have been principally used in upgrading straight-run gasolines. When desulfurizing cracked gasolines containing refractory sulfur compounds, these catalysts are generally unstable in the presence of sulfur compounds. Furthermore, these catalysts lose activity on continued usage and break up upon regeneration due to thermal stresses developed therein. In addition, they have a poor resistance toward attrition and hence are not practical for use in continuous commercial operations such as those employing a moving bed type unit.

It is a major object of the present invention to provide a catalytic hydrogenation method for removing sulfur compounds, including those of a refractory nature, from olefinic gasolines without encountering the difficulties inherent in the aforementioned prior art procedures. A further object is the provision of a process for desulfurizing olefinic gasoline stocks with simultaneous improvement in the anti-knock characteristics thereof. A still further object is the development of a desulfurization method for treating olefinic sulfur-containing gasolines utilizing a catalyst capable of maintaining its resulfurizing ability upon aging. Still another object is to provide a process for catalytically converting sulfur contained in organic bodies present in cracked gasolines to hydrogen sulfide. A very important object is the provision of a method for catalytic desulfurization of olefinic sulfur-containing gasolines which is capable of continuous commercial operation.

These and other objects which will be apparent to those skilled in the art are achieved in accordance with the present invention. Broadly, the process described herein involves desulfurization of olefinic gasoline stocks containing refractory-type sulfur compounds utilizing relatively high temperatures, moderately high space velocities, hydrogen pressure and a cogelled chromia-alumina catalyst.

It has been discovered, in accordance with the present invention, that chromia-alumina cogelled composites, under particularly defined reaction conditions hereinafter set forth, possess improved catalyst life and overcome disadvantages inherent with the use of previously employed catalysts in effecting desulfurization of olefinic gasolines. The catalyst used in the instant process is a chromia-alumina gel containing a major proportion of aluminum oxide and a minor proportion of chrominum oxide. Generally, the catalyst contains a chromium oxide content in the range of 15 to 30 mol. per cent and an alumina content in the range of 70 to 85 mol. per cent. A particularly preferred composition for use under the reaction conditions hereinafter set forth is one containing about 20 mol. per cent chromic oxide and about 80 mol. per cent aluminum oxide. It is contemplated that the above catalysts may be prepared by any appropriate procedure known in the art. A preferred method of preparation, however, is that described in the copending application of Stover and Wilson, Serial Number 201,537, filed December 14, 1950. The procedure described therein involves reacting of chromic acetate and sodium aluminate to yield a hydrosol having a chromia-alumina content of at least about 10 per cent by weight, controlling the sodium to aluminum ion ratio and the aceate to chromium ion ratio in such solutions to effect rapid gelation of the hydrosol to a hydrogel, aging the hydrogel so obtained in a mildly alkaline aqueous medium, washing the aged hydrogel, drying and calcining to afford a resulting hard chromia-alumina catalytic composite. A typical example of the above procedure for making the cogelled chromia-alumina catalyst is as follows:

*Solution A.*—47.5 pounds sodium aluminate made up to a volume of 10 gallons with distilled water;

*Solution B.*—48 pounds chromic acetate, the acetate to chrominum ratio of which is adjusted within the approximate range of 2.6 to 2.8 and then made up to a volume of 13 gallons with distilled water, providing a solution containing 0.92 mole $Cr_2O_3$ per liter.

Solutions A and B were pumped separately under pressure through heating coils to an efficient mixing nozzle. The solutions were heated to about 110° F. and mixed in equal volumes at a total rate of 1200 cc. per minute. The resulting stream of hydrosol flowed over a divider into a column of oil. The hydrosol set to beads of hydrogel and the resulting hydrogel beads were sluiced from the bottom of the forming tower with a 20 per cent by weight aqueous solution of ammonium sulfate. The sluicing solution was maintained at a pH of 8.5 by the addition of sulfuric acid. Since the pH of the hydrogel was about 10.5, it was necessary to add sulfuric acid to the sluicing solution in order to maintain the pH at 8.5. The bead hydrogel was aged for 24 hours in the same solution that was used to sluice from the forming tower. After aging, the gel was washed until a sulfate-free wash water was indicated. The washed hydrogel had a product concentration of 21 per cent by weight. The hydrogel was thereafter dried in 100 per cent steam at 260–270° F. for 3 to 4 hours and then tempered 4 hours at 1100° F. in a hydrogen atmosphere. The resulting beads of gel contained 21 mole per cent $Cr_2O_3$ and 79 mole per cent $Al_2O_3$.

The above method is particularly valuable in manufacture of the catalyst in the form of hard, glassy bead-like spheroids. A preferred embodiment of the present invention is the use of the catalyst in the form of spherical particles since it is thereby rendered more resistant to abrasion and hence particularly well adapted to moving bed type systems wherein the catalyst moves in a closed path including a reactor and a generator. Such bead-form (spheroidal) gel catalyst is advantageously prepared in equipment of the type described in U. S. Patent No. 2,446,783 to Payne.

When used in the desulfurization of cracked (olefinic) gasolines containing refractory sulfur in a hydrogenation operation under particular reaction conditions of temperature, pressure, space velocity and hydrogen concentration, the above catalyst is stable in the presence of sulfur compounds and maintains its activity through repeated cycles of desulfurization and regeneration. In addition, chromia-alumina gel beads have a resistance to attrition far superior to that of catalysts previously employed and hence can be satisfactorily used in an operation having a moving bed type of catalyst circulation, whereas the catalysts of the prior art are totally unsatisfactory for such operation.

The process of this invention may be carried out either on a continuous basis wherein the above-mentioned moving catalyst bed system is preferably employed or on a semi-continuous or batch basis using a fixed bed operation since the chromia-alumina gel catalyst can be maintained on stream over a period of from 5 to 20 hours, depending upon the particular conditions of operation, before regeneration is required. Regeneration of the catalyst is accomplished by heating the spent catalyst in the presence of air or other oxygen-containing gas at a temperature in the approximate range 900 to 1300° F.

Desulfurization of a cracked gasoline, in accordance with the present process, must be carried out under specific operating conditions in order to effect removal of the sulfur without appreciable decrease in the octane number or excessive loss in yield. For example, in conventional catalytic cracking, it has been shown that the severity of the operation may be reduced by lowering the temperature with a uniform change in product distribution and properties. Contrary to this, it has been found in the present process that as the severity of the operation is decreased by reducing the temperature, the octane number of the product actually falls far below that of the charge stock. Such drastic decrease in octane number would, of course, make the process impractical. Therefore, one important factor of this invention is control of temperature. It has been found that the temperature must be maintained at at least about 950° F. in order to obtain adequate desulfurization without encountering a large loss in octane number.

Figure 1 of the attached drawing illustrates this finding graphically. There, the effect of temperature is shown on the extent of sulfur removal, the octane number and the volume yield of treated stock for both a cracked gasoline and a straight-run gasoline under reaction conditions where the gauge pressure was maintained at 250 pounds per square inch, the molar ratio of hydrogen to hydrocarbon charge 4 to 1 and the space velocity 4 volumes of liquid hydrocarbon feed per hour per volume of catalyst. The catalyst was chromia-alumina gel containing 20 mol. per cent chromia and 80 mol. per cent alumina. An examination of this figure shows that, under the aforementioned contacting conditions, the minimum reaction temperature for desulfurizing the cracked gasoline stock without encountering a loss in octane rating is approximately 950° F. The same figure shows that a decrease in octane number does not take place when a straight-run gasoline is treated under identical conditions. Referring to the figure, it is evident that the straight-run gasoline has been desulfurized at a temperature of about 825° F. in good yield and with an actual increase in octane number. In contrast to this, the octane number of the cracked gasoline is actually decreasing at this temperature and the sulfur content thereof has not been adequately reduced since less than 0.1 per cent sulfur is generally desired. It will further be noted from this figure that the yield of treated stock decreases fairly rapidly with increasing temperatures in excess of 950° F. Accordingly, the preferred temperature range for operation of the instant process is between about 950° F. and about 1050° F., although temperatures up to about 1100° F. may in some instances be employed with advantage. It is to be understood, however, that a minimum operating temperature of about 950° F. is a critical feature of the present process.

The principal aim of reforming processes is to upgrade the octane number of the charge to the range of 80 octane number (Research, clear) or higher. This is accomplished at the expense of liquid recovery, resulting in relatively large losses in yield, and requires operation at comparatively severe conditions, i. e., high temperatures and liquid hourly space velocities of 0.5 to 1. It has been found possible, in accordance with the present process, to attain desired desulfurization by using relatively high space velocities at temperatures above 950° F. Since the olefinic gasolines undergoing treatment have a fairly high octane number initially, the resulting desulfurized product has the desired octane level and is obtained at a high yield.

Figure 2 of the drawing shows the effect of space velocity, expressed in volumes of liquid hydrocarbon feed per hour per volume of catalyst, on the extent of sulfur removal, the octane number and the yield of treated stock for both a cracked gasoline and a straight-run gasoline. Remaining reaction conditions were maintained constant at a gauge pressure of 250 pounds per square inch, a molar ratio of hydrogen to hydrocarbon charge of 4 to 1, and a temperature of 1000° F., utilizing a chromia-alumina gel catalyst of 80 mol. per cent alumina and 20 mol. per cent chromia. From an examination of this figure, it will be seen that an increase in space velocity in treatment of the cracked gasoline increased the product yield, decreased the extent of sulfur removal and decreased the octane number. With the straight-run gasoline stock, the yield likewise increased and the octane number decreased with a higher space velocity. The sulfur content of the straight-run product, however, remained essentially unchanged with increasing space velocity. The data show that at preferred operating conditions the cracked gasoline can be desulfurized to a lower sulfur level at correspondingly higher yields than the straight-run stock under identical conditions of treatment. Taking into account the desired yield, octane number, and extent of sulfur removal for cracked gasoline stock, it is preferred to maintain a space velocity within the range of about 3 to about 8 volumes of liquid per hour per volume of catalyst under the preferred operating conditions of the invention. Broadly, it is contemplated under varying conditions of operation that a space velocity in the approximate range of 2 to 20 volumes of liquid feed per hour per volume of catalyst may be employed.

Figure 3 of the attached drawing shows the effect of varying pressure expressed in pounds per square inch gauge on the extent of sulfur removal, the octane number, and the yield of treated cracked gasoline. The remaining reaction variables were maintained constant as follows: space velocity of 4, temperature of 990° F., and molar ratio of hydrogen to hydrocarbon charge of 4. The catalyst was the same as in preceding examples. From an examination of this figure, it will be noted that the sulfur content of the treated stock rapidly decreases with increasing pressures up to about 200 p. s. i. and thereafter remains approximately constant with further increasing pressures. The octane number gradually increases with increasing pressure up to about 200 p. s. i. and thereafter gradually decreases. The yield of product is decreased with the use of increasing pressures. Broadly, it is contemplated that gauge pressures over the range of about 100 to about 500 p. s. i. may be used in the present process. Preferred pressures, however, are those in the approximate range of 150 to 400 p. s. i. and particular preference is accorded pressures of between about 200 and about 250 p. s. i.

Figure 4 of the drawing illustrates the effect on sulfur content, octane number and yield when the concentration of hydrogen is increased in treatment of cracked gasoline stock. The catalyst employed was the same as above, temperature was maintained at 1000° F., pressure at 250 p. s. i. and space velocity at 4. The plotted data show that a molar ratio of hydrogen to hydrocarbon of at least 2 is required in order to attain satisfactory desulfurization. These data further indicate that no substantial additional advantages are to be obtained when using molar ratios appreciably greater than the above critical minimum value, although it is within the purview of this invention to employ molar ratios of hydrogen to hydrocarbon over the approximate range of 2 to 10. A preferred molar ratio range is about 2.5 to about 7 and in particular, as will be noted from the graph, an optimum molar ratio of hydrogen to hydrocarbon lies within the range of 3 to 5.

Both the cracked gasoline and straight-run gasoline stocks treated under the various conditions described above are California naphthas containing refractory type sulfur compounds. Similar stocks from West Texas or the Middle East would, in comparison, be relatively easy to desulfurize since they contain chiefly non-refractory type compounds. The properties of both the straight-run gasoline and the cracked gasoline used are set forth below:

*Table I*

|  | Straight Run Gasoline | Cracked Gasoline |
|---|---|---|
| ASTM Distillation, °F.: |  |  |
| IBP | 126 | 134 |
| 10% | 223 | 174 |
| 30% | 298 | 222 |
| 50% | 368 | 264 |
| 70% | 413 | 304 |
| 90% | 457 | 354 |
| E. P | 494 | 400 |
| API gravity | 45.0 | 55.2 |
| Norwood Bromine No | 11.5 | 96.2 |
| Vol. Percent Aromatics (Pulfrich) | 19.7 | 6.5 |
| Mixed Aniline No. (°C.) | 56.4 | 53.1 |
| Reid Vapor Pressure | 3.0 | 2.9 |
| Wt. Percent Sulfur | 0.75 | 1.0 |
| Research Octane Number, Clear | 70 | 77.5 |
| Research Octane Number, 3 cc. T. E. L | 79 | 84.5 |

The chromia-alumina cogelled catalyst used in the present process has several distinct advantages over conventional catalysts heretofore employed. Thus, probably the most favored catalyst previously employed has been molybdena on alumina gel. The catalyst used in the present process, however, is superior to this catalyst in three important respects, namely: (1) stability, (2) yield-octane relationship under the preferred operating conditions discussed above, and (3) form in which sulfur is removed from the process. The chromium oxide-alumina beads, preferably used in the instant process, have appreciably greater stability, as will be apparent from data tabulated hereinafter, and are less susceptible to attrition than the previously used catalysts. The latter characteristic is particularly valuable where the catalyst is to be used in a moving bed type operation. In addition, the cogelled chromia-alumina catalyst used herein affords a product of higher octane number in greater yield and with less coke formation, under the preferred operating conditions, than is possible using a catalyst of molybdena on alumina gel under identical conditions of treatment. Furthermore, as previously pointed out, molybdenum combines chemically with sulfur in the stock undergoing treatment and the sulfur is then removed as sulfur dioxide during regeneration. Elimination of excessive sulfur dioxide into the atmosphere is forbidden by law in many localities. With the use of the chromia-alumina gel catalyst in the present process, sulfur is removed as hydrogen sulfide and may be recovered if desired.

The chromia-alumina cogelled catalyst employed in the present process is also far more stable than other chromium oxide-aluminum oxide catalytic composites heretofore used and in addition possesses a much greater resistance to attrition than, for example, catalysts comprising chromia deposited on bauxite, or chromia on activated alumina. In Table II below, the stability of chromia-alumina gel catalyst under varying specified reaction conditions is compared with that of catalysts consisting respectively of chromia on bauxite, chromia on activated alumina, molybdena on gel alumina and molybdena on activated alumina.

perature not exceeding 1150° F. It will be seen from the tabulated results that the sulfur content of the product obtained from treatment with chromia-alumina beads which were used more than 280 cycles was unchanged while the sulfur content of the product obtained upon treatment with chromia on bauxite which was used more than 210 cycles increased until it was double that of the product from the used chromia-alumina beads. Likewise, the sulfur content of the product obtained upon treatment with molybdena on gel alumina which was used only 100 cycles was approximately double that of the product from treatment with chromia-alumina beads used over 280 cycles. From the foregoing data, it will be apparent that the chromia-alumina gel catalyst employed in the present method, under the preferred reaction conditions, is capable of maintaining its desulfurizing ability on aging. All of the other tested catalysts showed a 50 to Table II

| Test Conditions [1] | Catalyst Treatment | 20:80 Chromia-Alumina Beads | 12% $Cr_2O_3$ on Low-Silica Bauxite | 20% $Cr_2O_3$ on Activated Alumina | 10% $MoO_3$ on Gel Alumina | 10% $MoO_3$ on Activated Alumina |
|---|---|---|---|---|---|---|
| A | None | .05 | .09 | .06 | .04 | .22 |
|   | 36 Hrs. at 1,300° F.—$SO_2$ | .12 | .21 | .21 | .04 | .25 |
|   | Cycle Test [2] | .05(284) | .18(214) |   | .09(100) |   |
|   | 230 Hrs. at 1,500° F.—Air | .15 | .31 | .23 | .41 | .49 |
| B | None | .04 | .05 | .08 | .03 | .03 |
|   | 36 Hrs. at 1,300° F.—$SO_2$ | .03 | .06 | .11 | .05 | .07 |
|   | Cycle Test [2] | .09(284) | .13(214) |   |   |   |
|   | 230 Hrs. at 1,500° F.—Air | .05 | .13 | .10 | .15 | .08 |

|   | Temp., °F. | Pressure, p. s. i. g. | Space Velocity, V/Hr./V. | Molar Ratio—Hydrogen to Hydrocarbon |
|---|---|---|---|---|
| A | 1,000 | 250 | 4 | 4.0 to 5.0:1 |
| B | 1,000 | 500 | 4 | 3.5 to 4.5:1 |

[1] Cracked gasoline of Table I.
[2] 1,040° F.—250 p. s. i. g.—Sp. Vel.—4; 4 $H_2$ to 1 hydrocarbon; Average peak regeneration temperature—1,150° F. Figure in parentheses is number of cycles.

From the foregoing results, it will be seen that, in general, all of the tested catalysts had approximately the same initial desulfurization ability. However, chromia-alumina cogelled catalyst was far more stable upon usage than any of the others. Thus, it is to be noted that after treating the catalysts in a 100 per cent $SO_2$ atmosphere, which is an accelerated test for the aging effect of sulfur compounds at temperatures likely to be encountered during regeneration, the sulfur content of the product produced from treatment with chromia-alumina gel catalyst was about one-half that of the products produced from treatment with chromia on bauxite or chromia on activated alumina. The test method here employed involved placing the catalyst in a muffle furnace at 1300° F. for 36 hours and passing $SO_2$ continuously over the catalyst during this time. Likewise, when the catalysts were placed in a muffle furnace at 1500° F. for 230 hours and a slow stream of air passed thereover to determine the stability toward high temperatures encountered in catalyst regeneration, the sulfur content of the gasoline resulting from treatment with chromia-alumina gel catalyst was approximately one-half that obtained from treatment using any of the other catalysts. In a comparison of chromia-alumina beads, chromia on bauxite and molybdena on gel alumina, the effect of commercial operating conditions for alternate operation and regeneration is shown by the cycle test. This test involved subjecting the catalysts to a 3-minute nitrogen purge, followed by a 3-minute treatment with hydrogen, pressuring to 250 p. s. i. The on-stream period employing a temperature of 1040° F. and a hydrogen to hydrocarbon charge in a 4 to 1 molar ratio was 15 minutes. Thereafter, the catalyst was subjected to a 3-minute hydrogen purge, a 3-minute nitrogen purge, and then regenerated by burning coke therefrom in a controlled stream of air at a temperature not exceeding 1150° F. 100 per cent decline in desulfurizing ability under comparable or even less drastic conditions of treatment.

I claim:

1. A process for desulfurizing an olefinic gasoline, which comprises contacting a charge stock consisting of sulfur-containing olefinic gasoline with a cogelled chromia-alumina catalyst at a temperature of at least 950° F. in the presence of hydrogen at a gauge pressure of approximately 100 to 500 pounds per square inch and at a space velocity of at least about 2 volumes of liquid charge stock per hour per volume of catalyst, the molar ratio of hydrogen to said charge stock being maintained above 2 and said catalyst having been prepared by intimate admixture of solutions of sodium aluminate and chromic acetate to yield a chromia-alumina hydrosol which sets to a chromia-alumina hydrogel which is thereafter dried and calcined.

2. A catalytic process for simultaneous desulfurization and octane number improvement of a stock consisting of sulfur-containing olefinic gasoline, which comprises subjecting such sulfur-containing olefinic gasoline to hydrogenation at a temperature in the range of about 950° F. to 1100° F., a gauge pressure in the range of 100 to 500 pounds per square inch, a space velocity in the range of about 2 to about 20 volumes of liquid gasoline per hour per volume of catalyst, employing a molar ratio of hydrogen to said gasoline in the approximate range of 2 to 10 in the presence of a cogelled chromia-alumina catalyst consisting essentially of about 15 to about 30 mol per cent chromia and about 70 to about 85 mol per cent alumina prepared by mixing solutions of sodium aluminate and chromic acetate to yield a chromia-alumina hydrosol, effecting gelation of said hydrosol to a chromia-alumina hydrogel, drying and calcining the resultant hydrogel.

3. In the desulfurization of sulfur-containing olefinic gasolines by treatment with hydrogen, the improvement which comprises the reaction of hydrogen with refractory sulfur compounds contained in a charge consisting of olefinic gasoline in the presence of a catalyst consisting essentially of a major proportion of alumina cogelled with a minor proportion of chromia, prepared by intimate admixture of solutions of sodium aluminate and chromic acetate to yield a chromia-alumina hydrosol which sets to a chromia-alumina hydrogel which is thereafter dried and calcined, said reaction taking place at a temperature within the approximate range of 950° F. to 1050° F., a pressure in the approximate range of 150 to 400 pounds per square inch gauge, a space velocity in the approximate range of 3 to 8 volumes of said liquid charge per hour per volume of catalyst and a hydrogen to charge stock molar ratio in the approximate range of 2.5 to 7.

4. In the desulfurization of sulfur-containing olefinic gasolines by treatment with hydrogen, the improvement which comprises the reaction of hydrogen with refractory sulfur compounds contained in a charge consisting of olefinic gasoline in the presence of a cogelled catalyst consisting essentially of from about 15 to about 30 mol per cent chromia and from about 70 to about 85 mol per cent alumina, prepared by intimate admixture of solutions of sodium aluminate and chromic acetate to yield a chromia-alumina hydrosol which sets to a hydrogel which is thereafter dried and calcined, said reaction taking place at a temperature of at least about 950° F., a pressure in the approximate range of 200 to 250 pounds per square inch gauge, a space velocity in the approximate range of 2 to 20 volumes of said liquid charge per hour per volume of catalyst and a hydrogen to charge stock molar ratio in the approximate range of 3 to 5.

5. A process for desulfurizing an olefinic gasoline, which comprises contacting a charge stock consisting of sulfur-containing olefinic gasoline with a cogelled catalyst consisting essentially of a major proportion of alumina and a minor proportion of chromia at a temperature within the approximate range of 950° F. to 1050° F. in the presence of hydrogen at a gauge pressure of approximately 200 to 250 pounds per square inch and a space velocity in the approximate range of 3 to 8 volumes of liquid charge stock per hour per volume of catalyst, the molar ratio of hydrogen to said charge stock being maintained in the approximate range of 2.5 to 7 and said catalyst having been prepared by intimate admixture of solutions of sodium aluminate and chromic acetate to yield a chromia-alumina hydrosol which sets to a chromia-alumina hydrogel which is thereafter dried and calcined.

6. A catalytic process for simultaneous desulfurization and octane number improvement of a stock consisting of sulfur-containing olefinic gasoline, which comprises subjecting such sulfur-containing olefinic gasoline to hydrogenation at a temperature of at least 950° F., a gauge pressure in the range of 100 to 500 pounds per square inch, a space velocity of at least about 2 volumes of liquid gasoline per hour per volume of catalyst, employing a molar ratio of hydrogen to said gasoline in the approximate range of 2 to 10 in the presence of a cogelled chromia-alumina catalyst consisting essentially of a major proportion of alumina and a minor proportion of chromia prepared by mixing solutions of sodium aluminate and chromic acetate to yield a chromia-alumina hydrosol, effecting gelation of said hydrosol to a chromia-alumina hydrogel, drying and calcining the resultant hydrogel.

7. In the desulfurization of sulfur-containing olefinic gasolines by treatment with hydrogen, the improvement which comprises the reaction of hydrogen with refractory sulfur compounds contained in a charge consisting of olefinic gasoline in the presence of a chromia-alumina gel catalyst containing about 20 mol per cent chromia and about 80 mol per cent alumina, prepared by intimate admixture of solutions of sodium aluminate and chromic acetate to yield a chromia-alumina hydrosol which sets to a hydrogel which is thereafter dried and calcined, said reaction taking place at a temperature of at least 950° F., a pressure in the approximate range of 150 to 400 pounds per square inch gauge, a space velocity of at least about 2 volumes of said liquid charge per hour per volume of catalyst and a hydrogen to charge stock molar ratio above about 2.

8. A process for desulfurizing an olefinic gasoline, which comprises contacting a charge stock consisting of sulfur-containing olefinic gasoline with spheroidal gel particles consisting essentially of a major proportion of alumina and a minor proportion of chromia at a temperature within the approximate range of 950 to 1100° F. in the presence of hydrogen at a gauge pressure of approximately 100 to 500 pounds per square inch and a space velocity in the approximate range of 2 to 20 volumes of liquid charge stock per hour per volume of catalyst, the molar ratio of hydrogen to said charge stock being maintained within the approximate range of 2 to 10 and said catalyst having been prepared by intimate admixture of solutions of sodium aluminate and chromic acetate to yield a chromia-alumina hydrosol which sets to a chromia-alumina hydrogel which is thereafter dried and calcined.

9. A catalytic process for simultaneous desulfurization and octane number improvement of a stock consisting of sulfur-containing olefinic gasoline charge, comprising subjecting such sulfur-containing olefinic gasoline to hydrogenation at a temperature of at least about 950° F., a gauge pressure in the range of 150 to 400 pounds per square inch, a space velocity of at least about 2 volumes of liquid gasoline per hour per volume of catalyst, employing a molar ratio of hydrogen to said gasoline greater than 2 in the presence of spheroidal particles of chromia-alumina gel catalyst consisting essentially of about 15 to about 30 mol per cent chromia and about 70 to about 85 mol per cent alumina prepared by mixing solutions of sodium aluminate and chromic acetate to yield a chromia-alumina hydrosol, effecting gelation of said hydrosol to a chromia-alumina hydrogel, drying and calcining the resultant hydrogel.

10. In the desulfurization of sulfur-containing olefinic gasolines by treatment with hydrogen, the improvement which comprises the reaction of hydrogen with refractory sulfur compounds contained in a charge consisting of olefinic gasoline in the presence of spheroidal particles of chromia-alumina gel consisting essentially of about 20 mol per cent chromia and about 80 mol per cent alumina, prepared by intimate admixture of solutions of sodium aluminate and chromic acetate to yield a chromia-alumina hydrosol which sets to a hydrogel which is thereafter dried and calcined, said reaction taking place at a temperature within the approximate range of 950 to 1050° F., a pressure in the approximate range of 200 to 250 pounds per square inch gauge, a space velocity in the approximate range of 3 to 8 volumes of said liquid charge per hour per volume of catalyst and a hydrogen to charge stock molar ratio in the approximate range of 3 to 5.

References Cited in the file of this patent

UNITED STATES PATENTS

| | | |
|---|---|---|
| 2,322,070 | Stratford et al. | June 15, 1943 |
| 2,325,034 | Byrns | July 27, 1943 |
| 2,413,312 | Cole | Dec. 31, 1946 |
| 2,427,800 | Mattox | Sept. 23, 1947 |
| 2,486,361 | Nahin | Oct. 25, 1949 |
| 2,498,559 | Layng et al. | Feb. 21, 1950 |
| 2,500,146 | Fleck et al. | Mar. 14, 1950 |
| 2,547,380 | Fleck et al. | Apr. 3, 1951 |
| 2,577,823 | Stine | Dec. 11, 1951 |
| 2,623,007 | Myers | Dec. 23, 1952 |